United States Patent [19]

Suzuki et al.

[11] 4,428,655

[45] Jan. 31, 1984

[54] MODE SELECTOR DEVICE FOR A CAMERA

[75] Inventors: Nobuyuki Suzuki, Kawasaki; Masami Shimizu, Tokyo, both of Japan

[73] Assignee: Canon Kabushiki Kaisha, Tokyo, Japan

[21] Appl. No.: 301,535

[22] Filed: Sep. 14, 1981

[30] Foreign Application Priority Data

Sep. 16, 1980 [JP] Japan .................................. 55-128238
Sep. 16, 1980 [JP] Japan .................................. 55-128239

[51] Int. Cl.³ .............................................. G03B 7/08
[52] U.S. Cl. .................................. 354/456; 354/234.1; 354/258.1
[58] Field of Search .................. 354/50, 51, 234, 235, 354/238, 258

[56] References Cited

U.S. PATENT DOCUMENTS

| | | | |
|---|---|---|---|
| 3,650,193 | 3/1972 | Shimizu | 354/234 |
| 3,930,263 | 12/1975 | Urano | 354/258 |
| 4,024,553 | 5/1977 | Maitani et al. | 354/258 |
| 4,200,375 | 4/1980 | Ishiguro et al. | 354/50 |
| 4,332,452 | 6/1982 | Nakano et al. | 354/234 |

Primary Examiner—Russell E. Adams
Attorney, Agent, or Firm—Toren, McGeady and Stanger

[57] ABSTRACT

The mode selector device disclosed switches between a manual shutter time setting mode and an automatic shutter time setting mode, or between an electrically controlled shutter closing operation and a mechanically controlled shutter closing operation, by detecting the setting of a shutter time setting member to produce a signal level which controls a switching circuit to switch between the modes.

16 Claims, 3 Drawing Figures

MODE SELECTOR DEVICE FOR A CAMERA

BACKGROUND OF THE INVENTION

1. Field of the Invention

This invention relates to cameras, and particularly to a camera mode selector device capable of selecting between manual shutter time setting or automatic shutter time setting modes, or between electrically or mechanically controlled shutter closing operations, or both.

2. Description of the Prior Art

Systems are known for selecting a manual shutter time setting mode in which the shutter time is controlled in accordance with a predetermined shutter time or an automatic shutter time setting mode in which a shutter time is controlled in accordance with a calculated shutter time by changing the shutter time.

The aforementioned selection between the manual shutter time setting mode and the automatic shutter time setting mode has thus far been accomplished by a mechanical switch. Thus, setting the shutter time dial to the "AUTO" position switches a switch which connects an automatic exposure calculating circuit to the shutter time determining circuit. Setting the shutter dial out of the "AUTO" position to a desired shutter time sets the switch to connect the manual shutter time setting circuit to the shutter time determining circuit.

Cameras are known in which the short shutter times are mechanically controlled in order to raise the accuracy of the shutter time control, and the long shutter times are electrically controlled. The short shutter times are controlled only by a mechanical shutter mechanism, and the long shutter time is controlled with a sum of the times determined by the electrical shutter mechanism and the delay times of the mechanical shutter mechanism.

Consequently, the selection between the short shutter times and the long shutter time is performed with a mechanical switch set in the electronic shutter device and in operative engagement with the shutter dial.

The mode switching operation with a mechanical switch introduces problems in durability and reliability, and prevents the use of integrated circuits.

SUMMARY OF THE INVENTION

It is, accordingly an object of the present invention to provide an improved mode change over device for the camera which obviates the disadvantages of prior art devices.

It is another object of the invention to provide a mode selector device for the camera in which the level of the signal of the signal producing source in accordance with the setting of the shutter time setting member is detected so as to control the selector circuit by means of the detected output in such a manner that the manual shutter time setting mode or the automatic shutter time setting mode is selected, and/or the closing operation of the shutter is controlled electrically or mechanically.

It is further another object of the invention to provide a mode change over device for the camera in which the set signal from the signal producing source in accordance with the setting of the shutter time setting member and the standard signal from the standard signal producing source are compared with each other by means of the comparator so as to judge whether the set signal is over the standard signal or not, whereby the comparator controls the selector circuit so as to select the manual shutter time setting mode or the automatic shutter time setting mode.

It is further another object of the invention to provide a mode change over device for the camera in which the first holding member for the electrical shutter for holding the shutter closing member and the second holding member for the mechanical shutter are provided, while the set signal from the signal producing source in accordance with the setting of the shutter time setting member and the standard signal from the standard signal producing source in accordance with a certain determined shutter time are compared with the comparator with each other so as to judge whether the set signal is over the standard signal, whereby the comparator controls the shutter control magnet so as to select the first holding member or the second holding member in order to control the shutter time.

These and further objects and features of the invention will become apparent from the following detailed description of an embodiment thereof taken in connection with the accompanying drawings.

DESCRIPTION OF THE PREFERRED EMBODIMENT

Figure 1:
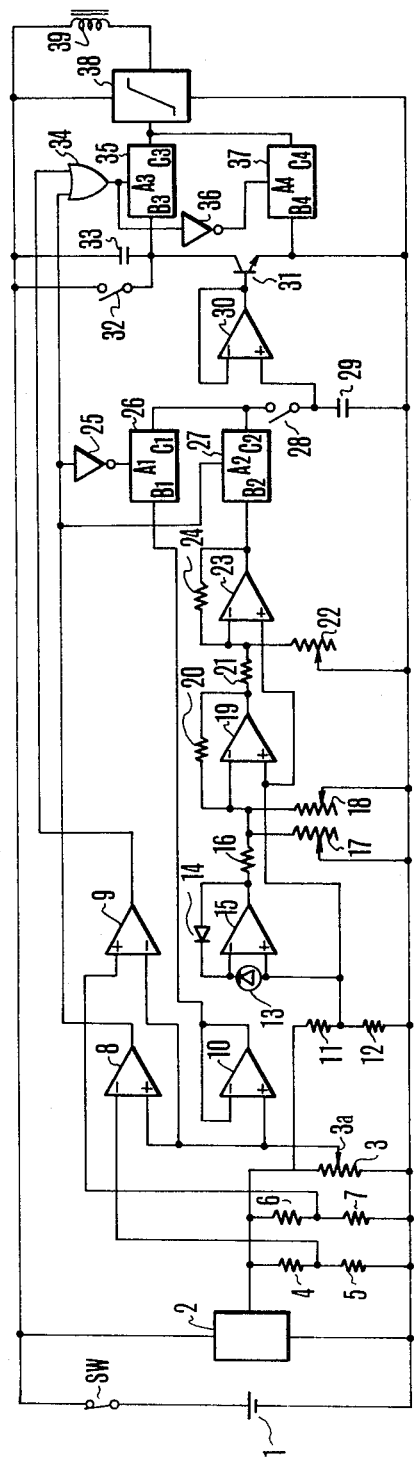
FIG. 1 shows a circuit diagram applicable to an embodiment of the mode change over device for the camera of the present invention.

FIG. 1 shows the control circuit which includes a power source 1, power source switch SW, a contact voltage circuit 2, and a variable shutter time information resistance 3 supplied by a constant voltage from the circuit 2. The variable resistance 2 is operatively engaged with the shutter dial that serves as the shutter time setting member. When the shutter dial is set at "AUTO" the voltage at the terminal 3 of the variable resistance 3 assumes its highest value, namely the same value as of the contact voltage of the circuit 2. When the shutter dial is set to "MANUAL", the longer the shutter time, the higher the voltage at the terminal 3a of the variable resistance 3. Resistors 4 and 5 form a voltage divider which receives the constant voltage from the contact voltage circuit 2. The divided voltage is set to be between the highest voltage at the terminal 3a of the variable resistance 3 and the highest voltage (for example corresponding to the shutter time of 1/2000 sec.) when the shutter dial is set at "MANUAL". Resistors 6 and 7 form a voltage divider which receives the contact voltage from the constant voltage circuit 2. The divided voltage is set to lie between the voltage (for example corresponding to 1/60 sec.) and that (for example corresponding to 1/125 sec.) at the terminal 3a of the variable resistance 3.

A voltage comparator 8 compares the voltage divided by the resistances 4 and 5 with that at the terminal 3a of the variable resistance 3 so as to produce a low level signal when the voltage at the terminal 3a is lower and a high level signal when the voltage at the terminal is higher. A voltage comparator 9 compares the voltage divided by the resistances (or resistors) 6 and 7 with that at the terminal 3a of the variable resistance 3 so as to produce a high level signal when the voltage at the terminal 3a is lower and a low level signal when the voltage at the terminal 3a is higher. An operational amplifier 10 serves as a buffer amplifier that receives the voltage at the terminal 3a of the variable resistance 3 and resistors 11 and 12 form voltage dividing resistances receiving the constant voltage from the contact voltage circuit 2. The voltage divided by the resistance 11 and 12 constitutes the bias voltage for the operational amplifiers 15, 19 and 23.

A light sensing element 13 produces a current proportional to the brightness of the object, and a logarithmically compressing diode 14 cooperates with an operational amplifier 15 for logarithmically compressing the current from the light sensing element 13. The circuit further includes a resistance 16, a film sensitivity information resistance 17, a the smallest F value compensation information resistance 18, an operational amplifier 19 for calculating the object brightness information as well as the film sensitivity information and the smallest F value compensation information, resistances or resistors 20 and 21, an aperture value information resistance 22, an operational amplifier 23 for calculating the output of the operational amplifier 14 and the aperture value information so as to produce a voltage corresponding to the shutter time, and a resistor or resistance 24.

An inverter 25 inverts the output of the comparator 8 and 26, 27, 35 and 37 $B_1$-$C_1$, $B_2$-$C_2$, $B_3$-$C_3$ and $B_4$-$C_4$ are respectively brought into the conductive state when the level of $A_1$, $A_2$, $A_3$ and $A_4$ are high. Paths $B_1$-$C_1$, $B_2$-$C_2$, $B_3$-$C_3$ and $B_4$-$C_4$ are respectively brought into the non-conductive state when the level of $A_1$, $A_2$, $A_3$ and $A_4$ are low. Input $A_1$ of the switching circuit 26 receives the output of the inverter 25, while $A_2$ of the switching circuit 27 receives the output of the comparator 8. A memory switch 28 is set to be opened in operative engagement with the lift up motion of the mirror not shown in the drawing, and a memory condenser or capacitor 29 is arranged to receive the output of the operational amplifier 10 or 22 depending upon the conductive state of the switching circuit 26 or 27. An operational amplifier 30 acts as the buffer amplifier and is connected to a logarithmically prolonging transistor 31. A count switch 32 is arranged to to be closed with the start of the leading shutter curtain and opened upon completion of the shutter wind up. A capacitor or condenser is charged with current through the transistor 31 and an OR gate 34 receives the outputs of the comparators 8 and 9. The output of the OR gate 34 is applied to $A_3$ of the switching circuit 35. An inverter 36 inverts the output of the OR gate 34, whose output is applied to $A_4$ of the switching circuit 37. A Schimidt trigger circuit 38 controls a trailing or tail shutter curtain control magnet 39. The schimidt trigger circuit energizes the magnet 39 when the input voltage is higher than a predetermined value. The input terminal of the Schimidt trigger circuit 38 is connected to $C_3$ and $C_4$ of the switching circuit 35 and 37, while $B_3$ of the switching transistor 35 is connected between the condenser 33 and the transistor 31 and $B_4$ of the switching circuit 37 is connected to the negative side of the battery 1.

Figure 2A:
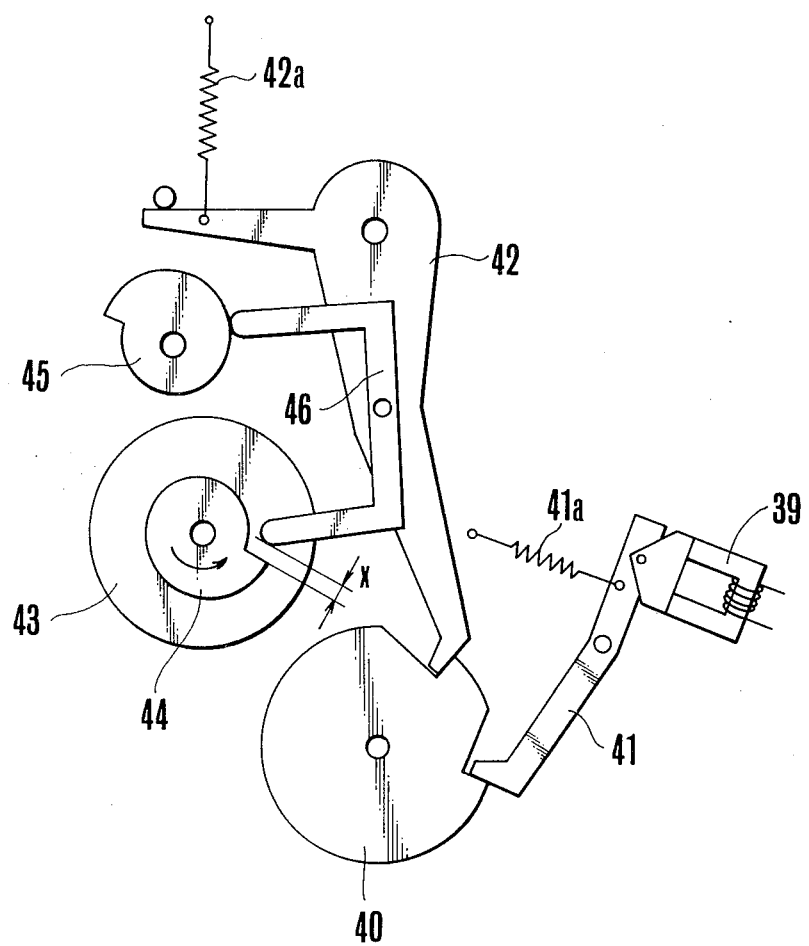
FIG. 2(a) shows the important part of the tail shutter curtain control mechanism applicable to the mode change over device for the camera of the present invention.
Figure 2:
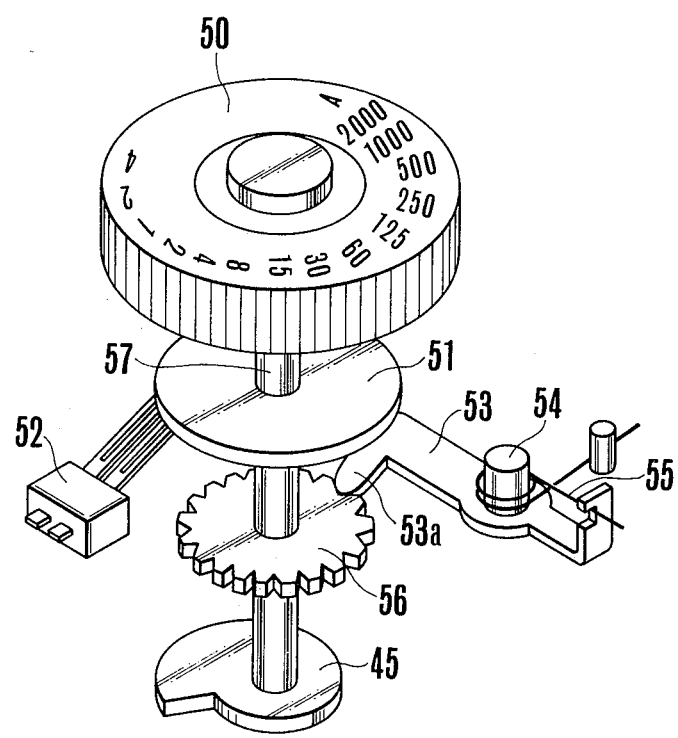
FIG. 2(b) shows the shutter dial mechanism connected to the cam 45 shown in FIG. 2(a) in perspective view.

FIGS. 2a and 2b show the important part of the tail or trailing shutter curtain control mechanism. In the drawing, member 39 is the tail shutter curtain control magnet shown in FIG. 1, 40 a tail shutter curtain master gear and 41 the first tail shutter curtain holding lever of the electrical shutter urged clockwise by means of the spring 41a. At the one end of the first tail shutter curtain holding lever 41 is mounted the armature of the magnet 39 and the other end of holding lever 41 holds the tail shutter curtain master gear 40. A second tail or trailing curtain holding lever 42 for the mechanical shutter is urged clockwise by spring 42a. An end of the second tail curtain holding lever 42 holds the tail or trailing curtain master gear 40. Member 43 is a leading shutter curtain master gear, on which the kick cam 44 is coaxially mounted. A cam 45 operatively engaged with the shutter dial 50 is shown in FIG. 2(b) to be explained and a C-shaped operatively engaging lever 46 pivots on the second tail curtain holding lever 42. One end of the lever 46 is in contact with the cam face of the cam 45 so as to control the rotational position of the lever 46 in accordance with the cam face. There is a distance X between the other end of the operatively engaging lever 46 and the kick face of the cam 44. The distance X can be adjusted in accordance with the rotation position of the engaging lever 46, so that by adjusting the distance X control of the short shutter time from 1/125 sec. to 1/2000 sec. is possible.

FIG. 2(b) shows the shutter dial mechanism to be connected to the cam 45 in prespective view. In the drawing, 50 is a shutter dial and 51 a base plate on which the shutter time variable resistance is mounted. A sliding brush 52 selects the desired value of the resistance on the base plate 51 and one end 53a of a click lever 53 engages a click cam 56 with the same number of notches the one end 53a of as that of the positions of shutter time provided on the shutter dial 50. The click lever 53 is mounted so as to be rotatable around the shaft, being urged by means of the spring 55 along the counterclockwise direction in such a manner that the one end 53a engages one of the notches on the click cam 56 so as to establish the set shutter time position on the shutter dial.

The cam is shaped so that the distance X between the operatively engaging lever 46 and the kick cam 44 remain unchanged whether the shutter dial 50 is set at the position "AUTO" or "MANUAL", say 1/200 sec. so that the mechanical shutter mechanism is always set 1/2000 sec. A dial shaft 57 is secured to the dial 50, the base plate 51 and cams 44 and 45.

The thus constructed trailing shutter curtain is held electrically and mechanically, so that the trailing shutter curtain start to run only when it is released from the electrical and the mechanical restraint. Consequently, the time in which the shutter is totally opened is determined by the delay of the release of the tail shutter curtain. Thus, when the shutter dial 50 is set at the position "AUTO", the mechanical shutter mechanism is set at 1/2000 sec. When the shutter dial 50 is moved out of the position "AUTO" into the "MANUAL" position corresponding to the desired shutter time, the mechanical shutter mechanism is set at the shutter time from 1/2000 sec. to 1/125 sec. and at 1/125 sec. from 1/60 sec. and the longer time.

When operating in the automatic shutter time setting mode, and the shutter dial 50 is set at "AUTO", the voltage at the terminal 3a of the shutter time information variable resistor 3 assumes a bright value, while the cam 45 rotates so as to make the distance X between the operatively engaging lever 46 and the kick cam 44 small, so the mechanical shutter time control is set at 1/2000 sec. Thus, the electrical shutter time control all over the range from the shortest to the longest shutter time becomes possible.

When the power source switch SW is closed, the voltage at the terminal 3a of the shutter time information variable resistance assumes the highest value. Thus, the voltage comparator 8 is driven to a high level signal, while the voltage comparator 9 delivers a low level signal. Thus, the switching circuits 27 and 35 are closed and $B_2$-$C_2$ and $B_3$-$C_3$ become conductive. Consequently, the input voltage of the Schmidt trigger circuit 38 is high and the level of the output of the circuit 38 becomes low so that the magnet 39 becomes conductive. On the other hand a current proportional to the brightness of the object runs through the light sensing element 13 and the operational amplifier 15 delivers a voltage logarithmically compressed by the operational amplifier 15 and the logarithmically compressing diode 14.

The brightness information from the operational amplifier 15, the film sensitivity information and the smallest F value compensation from the resistances 17 and 18 are combined in the operational amplifier 19, whose output is delivered to the operational amplifier 23, which operates with the output of the operational amplifier 19 and the aperture value information from the aperture value information variable resistance 22. The thus obtained voltage corresponding to the shutter time is delivered from the operational amplifier 23 to the memory condenser 29 through the switching circuit 27. The charge voltage of the memory condenser 29 is converted into the logarithmically prolonged current by means of the transistor 31 through the operational amplifier 30. When with the release operation of the camera the mirror has been lifted up, the leading shutter curtain starts to run. With the lifting of the mirror the memory switch 28 opens and the charge voltage of the memory condenser 29 is maintained. Then with the start of the leading shutter curtain and rotation of the leading shutter gear 43 the count switch 32 opens. The capacitor or condenser 33 is now charged with the current logarithmically prolonged by the transistor 31. The kick cam 44 rotatable together with the leading shutter curtain master gear 43 pushes the operatively engaging gear 46, and the second tail shutter curtain holding lever 42 is rotated against the force of the spring 42a in the counterclockwise direction so as to release the tail shutter curtain master gear 40 after the lapse of 1/2000 sec. after the start of the leading shutter curtain. However, because at this time the first trailing shutter curtain holding lever 41 hold the trailing shutter curtain master gear 40, the master gear 40 is prevented from rotating. When the charge of the condenser 33 causes the potential at the connecting point of the condenser 33 and the transistor 31 to reach a predetermined level, the input voltage of the Schmidt trigger circuit 38 becomes lower than a predetermined value and the output of the Schmidt trigger circuit 38 is inverted so as to interrupt the current supply to the magnet 34. The first trailing shutter curtain holding lever 41a now rotates counterclockwise to release the trailing shutter curtain master gear 40. Thus, the trailing shutter curtain master gear 40 rotates to let the tail shutter curtain start and terminate the exposure.

In operation in the manual shutter time setting mode the shutter time is controlled between 1/2000 sec. and 1/125 sec.

When the shutter dial 50 is brought out of the position "AUTO" into 1/1000 sec. the value of the shutter time information variable resistance 3 is set accordingly. At the same time the position of the cam 45 is determined in accordance with the set position of the shutter dial, so that the distance X between the kick cam 44 and the operatively engaging lever 46 is adjusted so as to correspond to 1/1000 sec. When then the power source switch SW is closed the voltage at the terminal 3a of the variable resistance 3 assumes the value corresponding to 1/1000 sec. Thus, the voltage comparators 8 and 9 deliver the low level signals. Hence, the switching circuits 26 and 37 are closed and $B_1$-$C_1$ and $B_4$-$C_4$ becomes conductive. Consequently, the input terminal of the Schmidt trigger circuit 38 is connected to the negative side of the battery 1 and the level of the output of the Schmidt trigger circuit 38 remain high so as to interrupt the current supply to the magnet 39. Thus, the first trailing shutter curtain holding lever 41 is rotated by means of the spring 41a along the counterclockwise direction so as to release the tail shutter curtain master gear 40.

The release operation of the camera causes the mirror to be lifted up, the leading shutter curtain starts to run with the rotation of the leading shutter curtain master gear 43. Then when the operatively engaging lever 46 is pushed with the kick cam rotatable together with the leading shutter curtain master gear 43 the second tail shutter curtain holding lever 42 is rotated counterclockwise against the force of the spring 42a to release the trailing shutter curtain master gear 40 after the lapse of 1/1000 sec. after the start of the leading shutter curtain. Thus, the trailing shutter curtain starts to run and terminates the exposure.

When the shutter time is controlled between 1/60 sec. and a longer time in the manual shutter time setting mode the system operates as follows.

When the shutter dial 50 is set for example 1/30 sec. the value of the shutter time information variable resistance 3 is set accordingly. At the same time the position of the cam 45 is decided in accordance with the set position of the shutter dial. Hence the distance X between the kick cam 44 and the operatively engaging lever 46 is adjusted so as to correspond with 1/125 sec.

When the power source switch SW is closed, the voltage at the terminal 3a of the variable resistance 3 assumes the value corresponding to the shutter time of 1/30 sec. Thus, the voltage comparator 8 produces a low level signal, while the voltage comparator 9 produces a high level signal. Hence, the switching circuits 26 and 35 are closed and $B_1$-$C_1$ and $B_3$-$C_3$ becomes conductive. Thus, the input voltage of the Schmidt trigger circuit 38 is high and the level of the output of the Schmidt trigger circuit 38 is low so that the magnet 39 becomes conductive.

The output voltage of the operational amplifier 10 corresponding to the variable resistance 3 is applied to the memory condenser 29 through the switching circuit 26. The charge voltage of the memory condenser is converted into a current logarithmically prolonged by means of the transistor 31 through the operational amplifier 30. When then the mirror is lifted up with the release operation of the camera, the leading shutter curtain, starts to run. With the mirror up motion the memory switch 28 is opened and the memory condenser 29 holds the charge voltage. The count switch 21 is opened with the start of the leading shutter curtain and the condenser 33 is charged with the current logarithmically prolonged with the transistor. When the operatively engaging lever 46 is pushed with the kick cam 44 rotatable with the leading shutter curtain master gear 44 the second trailing shutter curtain holding lever 42 is rotated clockwise by the spring 42a so as to attempt to release the trailing shutter curtain master gear 40 after the lapse of 1/125 sec. after the start of the leading shutter curtain. However, because at this time the first trailing shutter curtain lever 41 holds the trailing shutter curtain master gear 40, the master gear 40 is prevented from rotating.

Then, when the charge of the condenser 33 causes the level of the potential at the connecting point of the condenser 33 and the transistor 31 to reach a predetermined value, the input voltage of the Schmidt trigger circuit 38 becomes lower than a predetermined value and the output of the Schmidt trigger circuit 38 is inverted so us to interupt the current supply to the magnet 39. Thus, the first trailing shutter curtain holding lever 41a is rotated counterclockwise to release the trailing shutter curtain master gear 40. Then the trailing shutter curtain master gear 40 is rotated so as to open the leading shutter curtain and the trailing shutter curtain start to over after the lapse of 1/30 sec. so as to terminate the exposure.

In the aforementioned embodiment, the control range of the mechanical shutter mechanism is set between 1/125 sec. and 1/2000 sec. However, the present invention is not limited to the range. The range can be altered by changing sufficient to change the voltage dividing ratio of the resistances 6 and 7.

As explained above in detail, in accordance with the present invention the change over of the electrical circuit connected with the selection of the automatic shutter time setting mode and the manual shutter time setting mode is accomplished by means of the switching circuit by making use of the voltage comparator. Therefore, a mechanical switch is not necessary so that the durality and the reliability can be improved. The electrical circuit including the voltage comparators and the switching circuit can easily be formed as integrated circuits and as mentioned above the mechanical switch is not necessary. Hence, the device can be profitably used. This contributes much to the realization of a compact camera, the decrease of the cost and the weight of the camera.

Because the shutter can be mechanically controlled for a short shutter time in the manual shutter time setting mode the photograph can be taken whether a battery is present or not. Further at this time the current supply to the magnet of the electrical shutter is interrupted and therefore, the power is saved.

The signal source for selecting the "AUTO" and the "MANUAL" with the short shutter time and the long shutter time is the variable resistance 3 which is also used as the shutter time information source.

Further, the mechanical shutter control mechanism controls the short shutter time so that a complicated shutter time control is not necessary but only a mechanically simple shutter control mechanism is needed.

Further, because the shutter closing member is held by the first electrical shutter holding member and the second mechanical shutter holding member the curtain closing running is prevented in case of the control by means of the electrical shutter. The reason is that the mechanical shutter is always in operation in order to avoid the difficulty due to the electrical shutter even when the electrical shutter is in operation. That is, in the automatic shutter time setting mode the mechanical shutter is set at 1/2000 sec. while for a long shutter time in the manual shutter time setting mode the mechanical shutter is set for example at 1/125 sec.

What is claimed is:

1. A mode switching device for a camera comprising:
    a shutter apparatus controllable electrically and mechanically:
    a shutter time setting member manually settable to at least one shutter time value position for electrical shutter operation;
    a signal producing source for producing an electrical signal;
    the electrical signal level value of the signal producing source being set in accordance with the setting of the shutter time setting member;
    a changeover circuit responsive to the electrical signal value and coupled to the shutter apparatus for changing between electrical control of the shutter apparatus and mechanical control of the shutter.

2. A mode changeover device according to claim 1, wherein the changeover circuit includes a standard source and a comparator for comparing the set signal from the signal producing source with a standard signal from the standard signal source.

3. A mode changeover device for a camera with a manual shutter time setting mode for controlling the shutter time in accordance with a preset shutter time and an automatic shutter time setting mode for controlling the shutter time in accordance with a calculated shutter time, comprising:
    a shutter time setting member settable to select the automatic mode;
    a setting signal producing source for producing a set signal on the basis of the setting of the shutter time setting member;
    a standard signal producing source for producing a standard signal;
    a comparator for comparing the set signal from the signal producing source in accordance with the setting of the shutter time setting member in which the automatic shutter time setting mode can be selected and the standard signal from the standard signal producing source with each other; and
    a changeover circuit for switching between the manual shutter time setting mode and the automatic shutter time setting mode in accordance with the comparison output of the comparator.

4. For a camera with a shutter having an opening member and a closing member, a shutter control device comprising:
    a shutter;
    a shutter time setting member settable to a plurality of settings;
    an electrical signal producing source responsive to said time setting member for producing a set signal;
    a first holding member for electrically holding the shutter closing member;
    a second holding member for mechanically holding the shutter closing member;
    detecting means for detecting the level of the set signal from the signal producing source in accordance with the setting of the shutter time setting member; and
    a shutter control magnet responsive to the detected level to select one of the first holding member and the second holding member to control the shutter time.

5. A device for a camera according to claim 4, wherein a comparator serves for comparing the set signal from the signal producing source with a standard signal from a standard signal producing source to control the magnet.

6. For a camera with an electrically and mechanically controllable shutter, a shutter control comprising:
   a first holding member for electrical control of the shutter;
   a second holding member for mechanical control of the shutter;
   a shutter time setting member settable to a plurality of settings;
   a time signal producing source for producing a set signal;
   a standard signal producing source for producing a signal corresponding to a predetermined time;
   a comparator;
   an electromagnet for controlling the first member;
   means to establish the set signal from the time signal producing source in accordance with the setting of the shutter time setting member and the standard signal from the standard signal producing source corresponding to a predetermined time;
   said comparator being arranged to compare the set signal with the standard signal and to make the shutter control magnet controllable or uncontrollable in accordance with the comparison signal between the set signal and the standard signal;
   the second holding member being arranged to be adjusted in accordance with the setting of the shutter time setting member so that the shutter time is controlled by the first or the second holding member whichever is released later than the other.

7. For a camera with a mechanically and electrically controllable shutter having a closing member, a shutter control comprising:
   a first holding member for holding the closing member;
   an electromagnet;
   a second holding member;
   a mechanical mechanism;
   a shutter time setting member;
   a signal producing source for producing a set signal corresponding to the shutter time setting member;
   a comparator;
   a standard signal producing source for producing a standard signal corresponding to a predetermined time;
   said electromagnet being arranged to control the release of the holding member of the shutter closing member to determine the opening time of the shutter;
   the second holding member being separate from the first holding member;
   the mechanical shutter mechanism being arranged for controlling the release of the second holding member and for determining the opening time of the shutter between the predetermined shutter time and a shortest shutter time;
   said comparator being arranged for comparing the set signal from the signal producing source in accordance with the setting of the shutter time setting member and the standard signal from the standard signal producing source corresponding to the predetermined time so that when the set signal is below or above the standard signal, the comparator produces a first signal to enable the shutter control magnet and set the mechanical shutter mechanism at a time shorter than the predetermined time with the shutter time setting member and so that when the set signal is above or below the standard signal, the comparator produces a second signal to disable the shutter control magnet and the mechanical shutter mechanism is in operative engagement with the setting of the shutter time setting member which determines the opening time of the shutter.

8. A mode change over device for a camera, wherein a change over circuit performs the change over between a manual shutter time setting mode in which the time control is done on the basis of a predetermined shutter time and an automatic shutter time setting mode in which the time control is done on the basis of a computed shutter time, characterized in a change over circuit, a shutter time setting member for setting a shutter time and selecting the automatic shutter time setting mode, a signal producing source for producing a setting signal corresponding to the shutter time setting member, a standard source for producing a standard signal, and, a comparator for comparing a setting signal from the signal producing source in correspondence to the setting by the shutter time setting member with a standard signal and for producing a first signal when the set signal is not beyond the standard signal to change over the change over circuit to the manual shutter time setting mode, and for producing a second signal when the set signal is beyond the standard signal to change over the change over circuit to the automatic shutter time setting mode.

9. A mode change over device for a camera according to claim 1, further comprising:
   mechanical restraining means;
   electrical restraining means;
   said mechanical and electrical restraining means controlling cooperatively and selective shutter closing means for closing a shutter; and
   a mode change over device for controlling the electrical restraining means and for selecting one of said restraining means to be actuated to control the shutter closing means.

10. A mode change over device for a camera according to claim 9, wherein for a relatively high speed shutter time, the change over device serves to select the mechanical restraining means to control the shutter closing means, while at a relatively low speed shutter time said change over device is arranged to select said electrical restraining means to control the shutter closing means.

11. A mode change over device for a camera according to claim 9 or 10, wherein at a relatively short shutter time, the electrical restraining means are inhibited from being energized by said mode change over device.

12. A mode change over device for a camera according to claim 11, wherein said electrical restraining means includes an electromagnet.

13. A mode change over a device for a camera according to any one of claims 1 or 9–12, wherein said mode changeover circuit includes a comparator for comparing the set signal from the signal producing source in accordance with the setting of the shutter time setting member with the standard signal from the standard signal producing source corresponding to the predetermined time, said comparator causing said change over device to control said electrical restraining means by detecting the difference between the set signal and the standard signal.

14. A mode change over device for a camera according to any one of claims 1 or 9-13, wherein at a relatively long shutter time, said mechanical restraining means are controlled with a fixed short shutter time relative to a variable long shutter time by which the electrical restraining means are controlled to close the shutter.

15. A mode switching device for a camera comprising:
- a shutter time setting member manually selectable to a plurality of shutter time value positions for shutter operation in a manual time setting mode and manually settable to an automatic position for operation in an automatic setting mode;
- a signal producing source for producing an electrical signal;
- the electrical signal value of the signal producing source being arranged to be set in accordance with the setting of the shutter time setting member;
- a changeover circuit responsive to the electrical signal value and coupled to the shutter apparatus for changing over between the manual shutter time setting mode and the automatic shutter time setting mode.

16. A mode switching device for a camera according to claim 15, wherein the signal producing source is arranged to produce a signal of different level set in accordance with the setting of the shutter time setting member.

* * * * *